March 8, 1966 D. F. BUTLER, SR 3,238,986
SELF-LOCKING STRUCTURE
Filed July 16, 1963
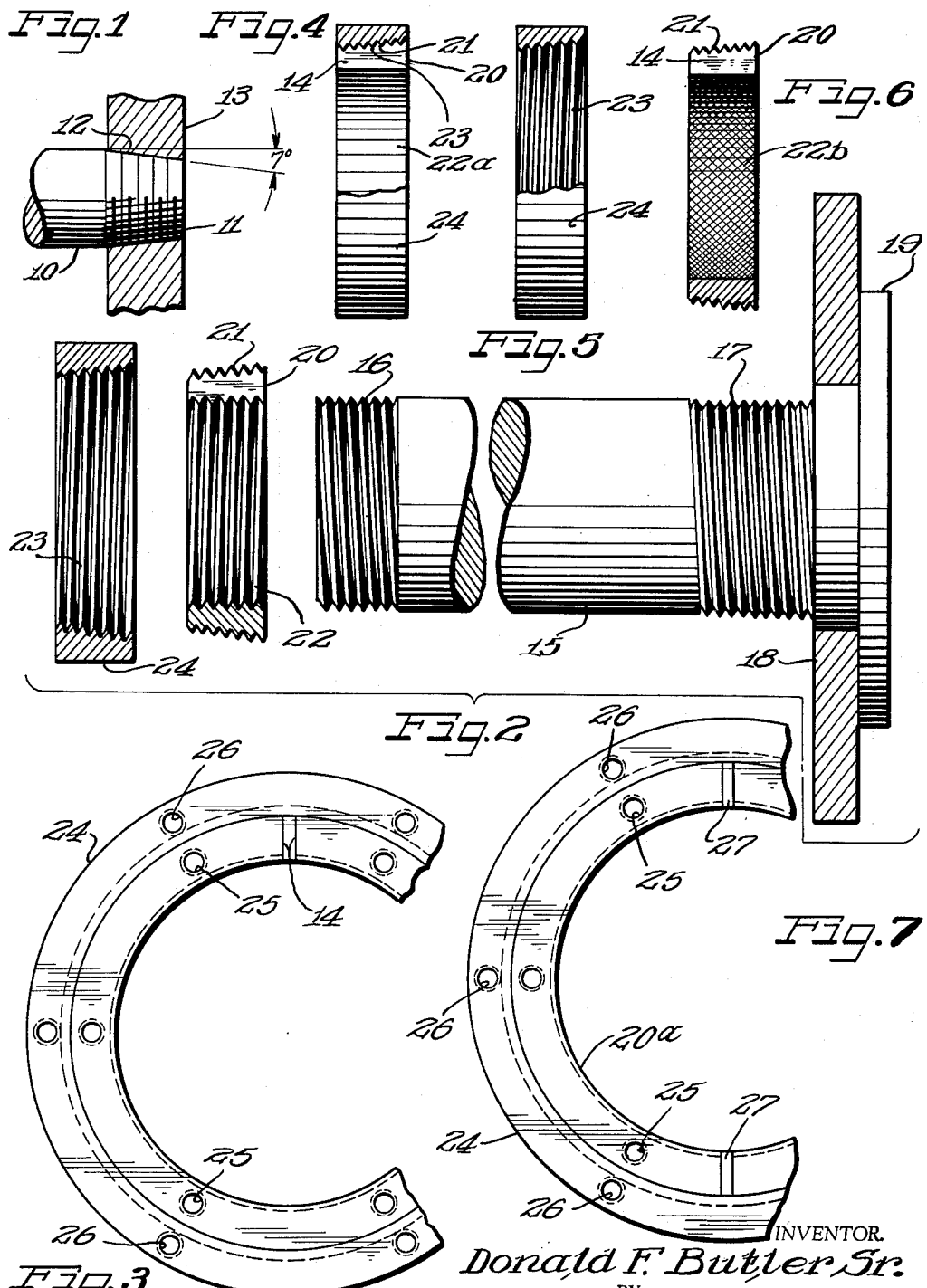
INVENTOR.
Donald F. Butler, Sr.

United States Patent Office 3,238,986
Patented Mar. 8, 1966

3,238,986
SELF-LOCKING STRUCTURE
Donald F. Butler, Sr., Box 295, Franklin Grove, Ill.
Filed July 16, 1963, Ser. No. 295,322
1 Claim. (Cl. 151—19)

This invention relates to improvements in locking devices and more particularly relates to improved forms of self-locking structures, such as studs, nuts and the like.

A principal object of the invention is to provide a self-locking structure, arranged with a view toward utmost simplicity and efficiency in construction and operation.

A further object of the invention is to provide a novel and improved form of self-locking structure having at least two components having interengagement with each other along tapered internal and external threaded surfaces in which the tapers of the threaded surfaces of the components and the counter forces generated in the planes of the threads react to hold the components from jarring loose.

A still further object of the invention is to provide an improved form a self-locking stud having a tapered threaded surface for threading within a corresponding threaded surface, in which the threads of the two surfaces are so formed as to interlock, and in effect form a solid member and sealed joint along the threads of threaded surfaces.

A still further object of the invention is to provide a novel locking structure having a split externally threaded member, internally threaded for threading on a bolt and the like, and having an internally threaded nut, the threads of the externally threaded member and the internally threaded nut being tapered to positively lock the externally threaded member on a bolt and the like upon tightening of the nut on the externally threaded member.

Still another form of the invention is to provide a locking structure in which an externally threaded member is internally threaded for threading on a bolt and the like and is in two parts with resilient separators between the parts to provide a leakproof joint upon the threading of a tapered nut thereon.

Still another object of the invention is to provide a two part locking structure, one part of which has external tapered threads and the other part of which has internal tapered threads in which the part having the external tapered threads may be slipped along a shaft and the like for threading on a remote portion of the shaft remote from the end thereof.

Still another object of the invention is to provide a self-locking structure having interengaging tapered threads in which the locking action is attained by the uni-planar action of the forces parallel to and perpendicular to the plane of the threads, as well as the forces generated by the angle of the taper of the threads.

These and other objects will appear from time to time as the following specification proceeds and with reference to the accompanying drawings wherein:

FIGURE 1 is a sectional view taken through a member having a tapered threaded portion showing a stud constructed in accordance with the principles of the present invention threaded therein;

FIGURE 2 is a partial sectional view showing a threaded shaft threaded at each end and showing a locking structure constructed in accordance with the principles of the present invention for threading on the remote end of the shaft by slipping of the locking structure along the shaft;

FIGURE 3 is a plan view of one form of locking structure constructed in accordance with the principles of the present invention for threading on the remote end of shaft by slipping of the locking structure along the shaft.

FIGURE 4 is a side view of a modified form of locking structure constructed in accordance with the principles of the present invention with certain parts broken away and certain other parts shown in section;

FIGURE 5 is a side view of the internally threaded member with a part thereof broken away and another part shown in section;

FIGURE 6 is a sectional view taken through the externally taper threaded member illustrating still another form in which the invention may be embodied; and FIGURE 7 is a plan view illustrating a further form in which the invention may be embodied.

In the embodiment of the invention illustrated in FIGURE 1 of the drawings, I have shown a stud 10 having a threaded tapered end 11 threaded within a threaded tapered hole or apertured portion 12 of a member 13, which may be a plate, a cylinder block of an internal combustion engine or any other member which may have a stud threaded therein.

As shown in FIGURE 1, the tapered hole or apertured portion 12 of the plate 13 has a taper of substantially 7°. The stud 10 has a similar taper. It has been found by experiment that a most satisfactory locking connection is attained with a taper angle of 7°, but that satisfactory locking may be attained where the taper is in the range of from 4° to 10°.

The thread angle may range from 45° to 60° and still give satisfactory results. A thread angle of 50°, however, has been found to give the best results.

Upon threading of the stud into the tapered hole 12 and tightening the stud to the tapered hole 12 and the plate 13, the taper along which the threads are cut, together with the angle of the threads, will effect a joining of the stud to the plate and form in effect a single member, so perfectly joined that when the stud and plate are cut and polished it is difficult to see the threads. The single member, therefore, formed by the tapered stud threaded into the tapered hole in the plate therefore forms a fluid tight joint, which, however, may be loosened by the use of a wrench and the like, and which joint due to the tightness of the joint will not rust between the threads of the joint. If desired, the plate 13 may be heated prior to final tightening of the stud.

A simple self-locking threaded connection has thus been attained which forms a tight enough connection to act as a fluid seal and which will not rust, but which may readily be loosened upon the application of the proper torque to the stud, far greater than the torque required to thread the stud to the plate.

In the form of the invention illustrated in FIGURES 2 and 3, I have shown in FIGURE 2 for illustrative purposes, a shaft 15 provided with threads 16 at one end and threads 17 at the opposite end. The shaft is shown as extending through a plate 18 adjacent the threaded portion 17 of the shaft and is provided with a flange 19 abutting the opposite side of the plate from the threads 17. The threaded end portion 16 of the shaft may also extend through a plate or the like.

I have also shown a split nut 20 having spaced facing faces 14, 14 and having a frusto-conical externally threaded surface 21. The split nut 20 also has an internal cylindrical threaded surface 22, which may be expanded and slipped along the shaft 15 and then threaded along the threads 17.

While the nut 20 is shown as being formed in one part and as being split, it may also be formed in two parts, to make it possible to more readily slip the nut along the shaft. The frusto-conical periphery 21 of the nut 20 is adapted to be engaged by an internally taper threaded portion 23 of a lock nut 24. The taper of the threads on the nut 21 and on the lock nut 24 is the same and the threads are cut of the same angle and lead. A taper of 7° has been found to be a most satisfactory taper and to give the best locking results, as in the form of the invention illustrated in FIGURE 1. A range of tapers from 4° to 10° will, however, give satisfactory locking results.

A thread angle of 50° has also been found to give optimum results. The thread angle may, however, be within the range of from 45° to 60° and satisfactory results will still be attained, as in the form of the invention illustrated in FIGURE 1.

It may be seen from the foregoing that when the nut 20 is threaded on either of the threaded portions 16 or 17 that the threading of the lock nut 24 on the nut will tend to contract the nut and tighten the nut on the threaded portion and provide a positive locking connection between the nut 20 and the threaded portions 16 or 17.

If desired, the lock nut may be tightened on the nut and then heated. A wrench then may be applied to the lock nut to give the lock nut a fraction of a turn to more positively lock the lock nut to the threaded portion of the shaft.

As herein shown, the nut 20 and lock nut 24 are annular in form and may be used as a bearing spacer on a shaft. The nut 20 is therefore provided with a series of holes 25 leading thereinto from the face thereof, while the lock nut 24 is shown as being provided with a series of holes 26 leading thereinto from the face thereof. The holes 25 and 26 form spaner holes adapted to be engaged by a spaner wrench.

In FIGURE 4, I have shown a locking structure like the locking structure shown in FIGURES 2 and 3 except the member 20 has a smooth cylindrical inner periphery 22a instead of a threaded inner periphery. The smooth inner periphery is adapted to be placed on a smooth shaft and locked thereto by threading the lock nut 24 thereon. This structure is particularly adapted to act as a thrust collar.

In FIGURES 5 and 6 I have shown still another form of locking structure which may efficiently serve as a thrust collar. In this form of the invention, the lock nut 24 is like the lock nut shown in FIGURES 2, 3 and 4. The nut 20, however, has a knurled inner periphery 22b and may be locked into firm engagement with a smooth shaft and the like, by tightening a lock nut 24 thereon. This structure is for more rugged service than the structure of FIGURE 4.

In the form of the invention illustrated in FIGURE 7, I have shown a lock nut structure similar to that shown in FIGURES 2 through 6, in which the nut 20 is in two parts 20a, 20a, having spacers 27, 27 connected between the adjacent ends of the parts. The spacers may be made from neoprene, Teflon, nylon or rubber, and may be bonded to the two parts to form a continuous nut, or may be bonded to one part or the other to engage the adjacent ends of the other part and form a liquid tight seal between the parts, when the lock nut 24 is threaded thereon, to lock the nut 20 to a shaft and the like.

While I have shown spacers between each part, one spacer may be provided where it is necessary to have a fluid type joint and the nut is slit only at one side thereof.

It may be seen from the foregoing that I have provided an improved form of self-locking structure in the form of either a stud or a lock nut, in which locking is attained by the threading of one tapered member within another tapered member to provide a leakproof and rustproof joint along the tapered threads, and also to prevent breaking and stripping of the threads, heretofore caused by excessively tightening the studs, and that the locking effect is attained by the taper of the interengaging threaded portions reacting against the thread angles.

While I have herein shown and described several forms in which my invention may be embodied, it may readily be understood that various variations and modifications in the form shown may be attained without departing from the spirit and scope of the novel concepts of the invention.

I claim:

A self-locking fluid tight threaded connection comprising an internally threaded annular male member split into two sections, having facing end surfaces and having resilient inserts made from a non-metallic fluid impervious material, between the facing end surfaces of said two sections and bonded thereto, and also having an external frusto-conical threaded face tapering at an angle of 7°, the thread angles of the threads of which are 50°, and an internally threaded annular female member having an internal frusto-conical threaded face tapering at the same angle as the angle of taper of said external threaded face of said male member, the threads of which are at the same thread angles as the threads of said external frusto-conical threaded face, for threading on said male member and locking said male member to a shaft and the like.

References Cited by the Examiner

UNITED STATES PATENTS

| | | | |
|---|---|---|---|
| 370,168 | 9/1887 | Truxal | 85—33 |
| 490,585 | 1/1893 | McCormick | 151—19 |
| 731,983 | 6/1903 | Vauclain | 151—19 |
| 1,081,239 | 12/1913 | Lantz | 151—19 |
| 1,405,342 | 1/1922 | Shaffer | 85—33 |
| 2,318,415 | 5/1943 | Patzschke et al. | 151—70 |
| 2,355,285 | 8/1944 | Ericsson | 151—19 |
| 3,074,746 | 1/1963 | Shames et al. | 285—322 |
| 3,097,728 | 7/1963 | Vocum | 151—14 |
| 3,127,198 | 3/1964 | Orund | 285—146 |

EDWARD C. ALLEN, *Primary Examiner.*